United States Patent
Sasaki et al.

(10) Patent No.: US 8,355,298 B2
(45) Date of Patent: Jan. 15, 2013

(54) MAGNETIC RECORDING HEAD HAVING A FLEXIBLE HEAT-CONDUCTIVE MEMBER OF PREDETERMINED CURVATURE

(75) Inventors: Shigeyuki Sasaki, Kasumigaura (JP); Shigeo Ohashi, Tsuchiura (JP); Noriyo Nishijima, Abiko (JP); Shigeo Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/694,380

(22) Filed: Jan. 27, 2010

(65) Prior Publication Data
US 2010/0195450 A1 Aug. 5, 2010

(30) Foreign Application Priority Data
Jan. 30, 2009 (JP) ................. 2009-018944

(51) Int. Cl.
*G11B 11/00* (2006.01)
(52) U.S. Cl. .................. 369/13.33; 369/13.13
(58) Field of Classification Search ............... 369/13.33, 369/13.13, 13.02, 13.17, 13.24, 300, 112.09, 369/112.14, 112.21, 112.27; 360/59; 385/129, 385/31, 88–94; 29/603.01–603.27
See application file for complete search history.

(56) References Cited

U.S. PATENT DOCUMENTS

| 6,360,035 | B1 | 3/2002 | Hurst, Jr. et al. |
| 6,404,706 | B1 * | 6/2002 | Stovall et al. ............... 369/13.17 |
| 6,665,136 | B2 * | 12/2003 | Clinton et al. .................. 360/55 |
| 2002/0150035 | A1 * | 10/2002 | Bernacki et al. ............. 369/300 |
| 2008/0130155 | A1 * | 6/2008 | Naniwa et al. ............. 369/13.33 |

FOREIGN PATENT DOCUMENTS
JP 2008-059695 3/2008
JP 2008-130106 6/2008

* cited by examiner

*Primary Examiner* — Tan X Dinh
(74) *Attorney, Agent, or Firm* — Antonelli, Terry, Stout & Kraus, LLP.

(57) ABSTRACT

A magnetic disk drive, comprising: a slider, which is provided at a position facing to a disk surface; an arm, which is configured to conduct rocking motion around a pivot; a base, which is configured to support a motor thereon, which rotates the disk; a semiconductor laser module, which is configured to be fixed on the arm and stores a semiconductor laser element therein; a light irradiation portion upon the disk surface; and a wave guide, which is configured to build up an optical path between the light irradiation portion and the semiconductor laser module, wherein the semiconductor laser module and a portion of the base are connected therebetween by a flexible heat-conductive member having a predetermined curvature.

13 Claims, 10 Drawing Sheets

MAGNETIC RECORDING HEAD HAVING A FLEXIBLE HEAT-CONDUCTIVE MEMBER OF PREDETERMINED CURVATURE

BACKGROUND OF THE INVENTION

The present invention relates to a magnetic disk drive (or a hard disk drive).

Magnetic recording with applying a thermal assist method therein, wherein heat equal to or greater than 200° C. and magnetic field are applied within a recording bit area or region, having diameter of about several tens nm on a magnetic disk, is expected to be a high-density recording method for a next generation, and various kinds of developments are made thereon.

At present, studies are made, widely, upon using a near-field light, as a means for rising up the very small or minute recording bit region on the magnetic disk up to high temperature, simultaneously. For generating such near-field light, it is necessary to introduce or guide a light into a near-field light converter element, which is disposed in vicinity of recording magnetism of a magnetic head. As a light source of that, it is studied to apply a semiconductor diode.

However, the semiconductor diode is known as the light source for enabling to output a concentrated light of a single wavelength, but at the same time, holding a problem that, because of the heat generation of itself as a heat source, an oscillation output thereof is lowered down with an increase of temperature. For that reason, cooling of the semiconductor laser is an important problem to be dissolved, in the magnetic disk drive according to the thermal assist method.

On the other hand, as the structure for installing that of the thermal assist method is disclosed a technology, in the following Patent Document 1, wherein an optical path is connected by a wave guide, for the purpose of heating a disk surface, from a light emission portion in the vicinity of a slider up to the semiconductor laser, which is mounted on a base through a substrate or a circuit board.

Also, in the following Patent Document 2 is disclosed the structures for mounting the semiconductor diode in the vicinity of a recording coil of the slider.

And also, in the following Patent Document 3 is disclosed the structures for mounting the semiconductor laser on an arm for supporting the slider, which does rocking motion with respect to the disk and builds up a recoding coil therein.

PRIOR ART DOCUMENTS

Patent Documents

[Patent Document 1] U.S. Pat. No. 6,360,035;
[Patent Document 2] Japanese Patent Laying-Open No. 2008-59695 (2008); and
[Patent Document 3] Japanese Patent Laying-Open No. 2008-130106 (2008).

BRIEF SUMMARY OF THE INVENTION

The Patent Document 1 mentioned above discloses therein a technology of the magnetic disk drive according to the thermal assist method, combining an optical recording method and a magnetic recording method, with mounting the semiconductor later within a housing thereof. However, in the same document, no consideration is paid in relation to cooling of the semiconductor laser, which generates heats therefrom. Also, for the purpose of guiding the lights from the semiconductor laser on the base to the vicinity of the emission portion, i.e., in the vicinity of the slider at a tip of the arm, it is necessary to dispose a wave guide, having a small loss and being flexible. However, the wave guide having a small loss, for use of a single wavelength, is relatively large in radium of curvature thereof, within which it can be bent or wound. For that reason, there is a problem that it is difficult to provide the wave guide within an inside of the magnetic disk drive, i.e., within the sizes of the present product, being high in packing density thereof.

Also, the technology shown in the Patent Document 1 mentioned above relates to the structures for mounting the semiconductor laser in the vicinity of the magnetic head including the recording coil therein. With applying such structures, the distance from an oscillation source to the emission portion is short; therefore it is possible to bring a loss of light transmission down to be smallest. However, weight of the slider portion doing the rocking motion is increased, because of the semiconductor laser and a mounting substrate thereof, etc., than that of a single body of the slider. For this reason, a load upon a voice-coil motor for positioning the recording coil comes to be large, and this results into prevention of high-speed positioning thereof. Also, in case where an impact is applied on the magnetic disk drive, etc., it results into an increase of disturbances when it is positioning, and in case where it is hard, a problem is generated that the slider cannot maintain the minute flying amount, and then it contacts on the disk (i.e., crush).

In the technology described in the Patent Document 3, the semiconductor laser is mounted on a side surface portion of the arm portion, in the vicinity of a pivot thereof, so as to use the arm as a heat radiation surface. In case of this structure, since a number of problems is relatively small comparing to that in other portions, it can be considered to be an effective position where the semiconductor laser should be mounted in the drive according to the thermal assist method. However, in this structure, when putting a resin material, such as, polyimide, for example, as an insulating material, between the arm and the semiconductor laser, since heat or thermal resistance of the insulating material of resin is large, it is impossible to obtain a cooling performance desired, and therefore, there is a problem that an increase of temperature of the semiconductor laser comes to be large.

Further, in case where the semiconductor laser is located on a backflow side of the arm, within airflow generated accompanying with rotation of the disk, the airflow at high-speed does not hit on the semiconductor laser, and also heat radiation thereof can be hardly obtained into the air. Further, when increasing the output of the semiconductor laser for supplying or filling up the optical losses in various positions, since the heat generated raises temperature in the vicinity of the arm, in particular, connecting portions with the semiconductor laser; therefore a large distribution of temperature is produced on the arm. With thermal deformation due to this distribution of temperature, there is a problem of lowering accuracy in positioning when recording.

An object, according to the present invention is to provide a magnetic disk drive applying the thermal assist method therein, being superior in a long time reliability thereof, with allowing the semiconductor laser to emit lights with stability, by cooling the semiconductor laser when emitting the lights, efficiently, down to a predetermined temperature or lower than that.

The object mentioned above is accomplished by, according to the present invention, a magnetic disk drive, comprising: a slider, which is provided at a position facing to a disk surface; an arm, which is configured to conduct rocking motion around a pivot; a base, which is configured to support a motor thereon, which rotates said disk; a semiconductor laser module, which is configured to be fixed on said arm and stores a semiconductor laser element therein; a light irradiation portion upon said disk surface; and a wave guide, which is configured to build up an optical path between said light irradiation portion and said semiconductor laser module, wherein said semiconductor laser module and a portion of said base are connected therebetween by a flexible heat-conductive member having a predetermined curvature.

Also, according to the present invention, in the magnetic disk drive as described in the above, a curvature of a flexible board, which connects a circuit board, which is fixed on said arm, and a circuit board, which is fixed on said base, and the curvature of said flexible heat-conductive member are so determined that centers of both the curvatures are located in vicinity of said pivot.

Also, according to the present invention, in the magnetic disk drive, as described in the above, a direction, in which said arm rotates around said pivot due to the predetermined curvature of said flexible heat-conductive member, is directed opposite to force, with which said flexible board brings said arm to rotate.

Also, according to the present invention, in the magnetic disk drive, as described in the above, said flexible heat-conductive member has structure of putting a metal thin film of a cupper group between electrically insulating members, including polyimide films.

Also, according to the present invention, in the magnetic disk drive, as described in the above, said flexible heat-conductive member is a graphite sheet, which is laminated by a member made of a resin.

Also, according to the present invention, in the magnetic disk drive, as described in the above, an opening is formed on said base, and a member is provided to be inserted into that opening.

Also, according to the present invention, in the magnetic disk drive, as described in the above, a circuit board for use of a recoding coil is fixed on said arm, and said semiconductor laser module is provided on side near to the arm rather than said circuit board.

Also, according to the present invention, in the magnetic disk drive, as described in the above, the semiconductor laser elements fixed on said arm are attached on side near to the suspension rather than vicinity of said pivot.

Also, according to the present invention, in the magnetic disk drive, as described in the above, said flexible heat-conductive member is built up by piling up as least two (2) pieces of members, being same to each other in shapes thereof.

Also, according to the present invention, in the magnetic disk drive, as described in the above, a through hole is provided on a surface of said flexible heat-conductive member in a direction perpendicular thereto.

Also, according to the present invention, in the magnetic disk drive, as described in the above, a portion of said base is adhered at one end of a core material of said flexible heat-conductive member, and at other end thereof is adhered said semiconductor laser module.

Also, according to the present invention, in the magnetic disk drive, as described in the above, said flexible heat-conductive member is fixed by base heat-conductive members, which are divided into two (2), by putting it between them.

Also, according to the present invention, in the magnetic disk drive, as described in the above, heat conductivity of the core material of said flexible heat-conductive member is equal to or higher than 200 W/mK in a surface direction thereof.

According to the present invention, it is possible to provide a magnetic disk drive with applying thermal assist method therein, being superior in a long time reliability thereof, with allowing the semiconductor laser to emit lights with stability, by cooling the semiconductor laser when emitting the lights, efficiently, down to a predetermined temperature or lower than that.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Embodiment 1

Figure 1:
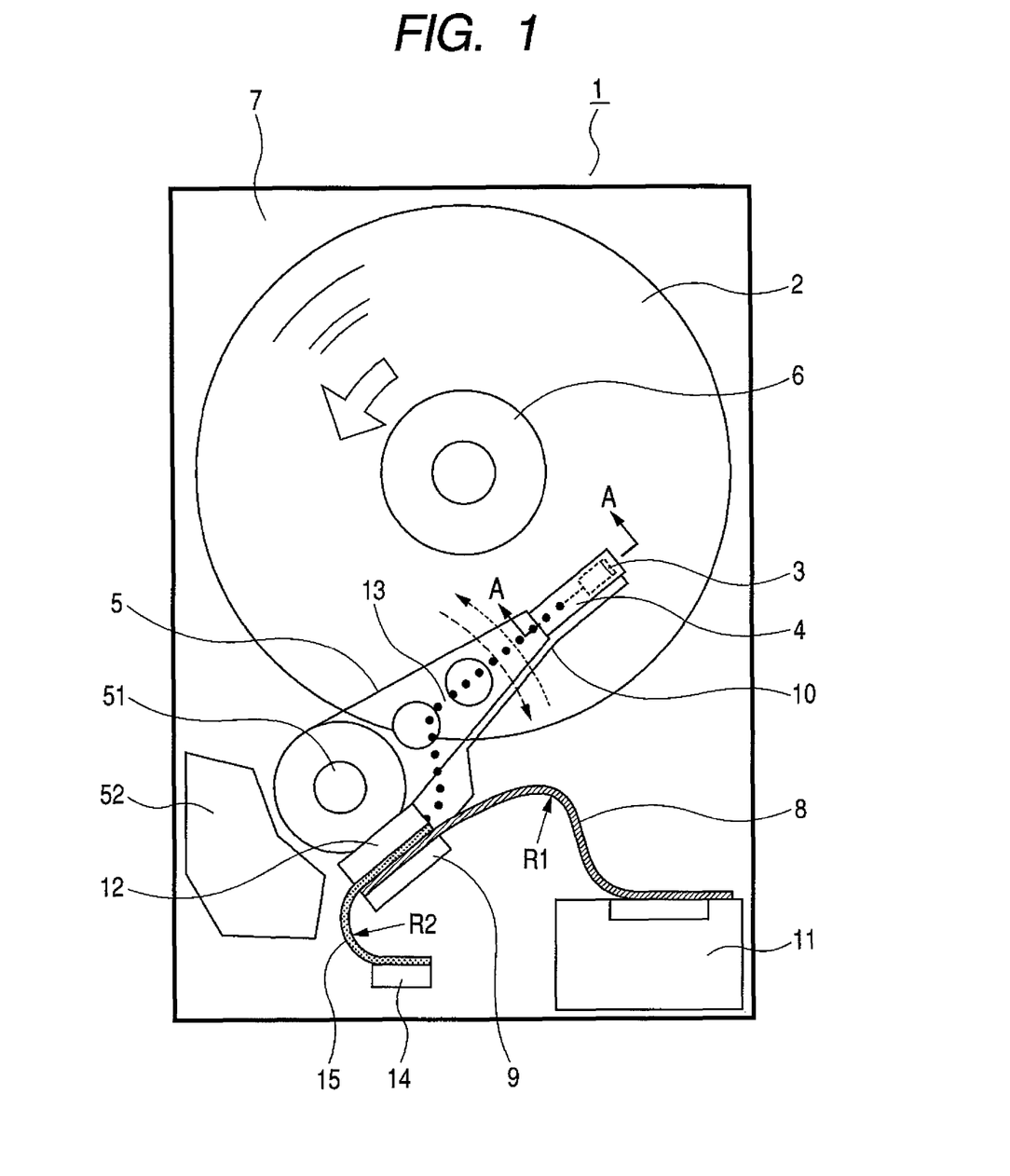
FIG. 1 is a view for showing a magnetic disk drive, removing a housing thereof, according to a first embodiment of the present invention.

FIG. 1 shows an embodiment of a hybrid-type thermally assisted magnetic disk drive of combining type, i.e., combining an optical recording method and a magnetic recording method therein, according to the present invention.

In this FIG. 1, within an inside of the conventional magnetic disk drive, applying only the magnetic recording method therein, there are provided a disk 2 having a recoding surface, on which a magnetic material is applied or pasted, a slider building a magnetic head therein and flying on the disk, defining a very small gap therebetween, such as, about several nm (nanometer), due to a function of fluid pressure, a suspension 4 for mechanically supporting the slider with elasticity thereof, and an arm 5 for moving the slider through the rocking motion, due to a function of a voice coil motor 52. Also, a motor 6 for rotating the disk is attached on a base 7, which is built up with an aluminum cast, mainly.

Between electrodes of a recoding coil of the slider 3 and a circuit board mounted the arm thereon (hereinafter, being called a "arm-mounted circuit board"), such as, a pre-amplifier for signals, etc., they are connected with, electrically, by means of a flexible board 10. The arm-mounted circuit board 9 and a circuit board 11, which is fixed on the base 7, are connected with the elastic flexible board 8. This flexible board 8 is in thin sheet-like shape, having depth in the direction perpendicular to the sheet surface of FIG. 1, and having the structure of putting or sandwiching a cupper thin film between resin films of polyimide having thickness of about several tens μm (micrometer). Preferably, this flexible board 8 has characteristics of suppressing a reaction force due to bending, as small as possible, while lowering wire resistances thereof so as not to prevent the rocking motion of the arm 5.

Next, as a special part necessary for the optical recording method applying the thermal assist method therein, there is a semiconductor module 12. This semiconductor module 12 is installed in a portion near to a pivot 51 of the arm 5. Within the semiconductor module 12 is mounted a semiconductor laser having oscillation portions, corresponding to the piece number of the slier 3. Or, it may be a module mounting an optical switch thereon, for switching over optical paths for the semiconductor laser. A wave guide 13 is provided on the semiconductor module 12 and up to the slider 3. At a predetermined position on the base 7 is provided a base-heat conducting member 14, and between the semiconductor module 12 and the base-heat conducting member 14, they are connected with a heat-conductive flexible member 15.

This heat-conductive flexible member 15 may have the structure of putting or sandwiching a cupper thin film between polyimide films, or laminating a graphite sheet with a resin film, etc., as far as it has superior heat conducting characteristics, and preferably, it is made of a material having flexibility. Further, for the purpose of transmitting the heat of the semiconductor laser module to the base, effectively, it is preferable that thermal conductivity of the core material thereof in surface direction is equal to 200 W/mK or greater than that, such as, cupper or graphite, etc., with this the thermal resistance thereof can be made small. Also, it is also preferable that the member has an elastic modulus in bending, being similar to that of the flexible board for use of electric signal wiring, as will be explained below, for the purpose of bearing the function of the present invention.

Mentioning about an aspect of building up the feature of the present invention, the flexible board 8 has a curvature of "R1", and a center of the curvature lies on the side near to a center of the pivot 51 rather than the flexible board. Also, the feature lies in an aspect that the heat-conductive flexible member 15 has a curvature "R2" and a center of the curvature is disposed in an inner side, near to the center of the pivot 51 rather than the flexible member.

With such structures, although a force is produced for brining the arm 5 to rotate around the pivot 51 directing in one side, with provision of only the flexible board 8, but with an aid of the heat-conductive flexible member 15, a force is produced on the arm directing in the opposite side; i.e., producing a force for cancelling the rotation of the arm. As a result thereof, operating electricity of the voice coil motor can be reduced, and the positioning accuracy thereof will not fall down.

Figure 2:
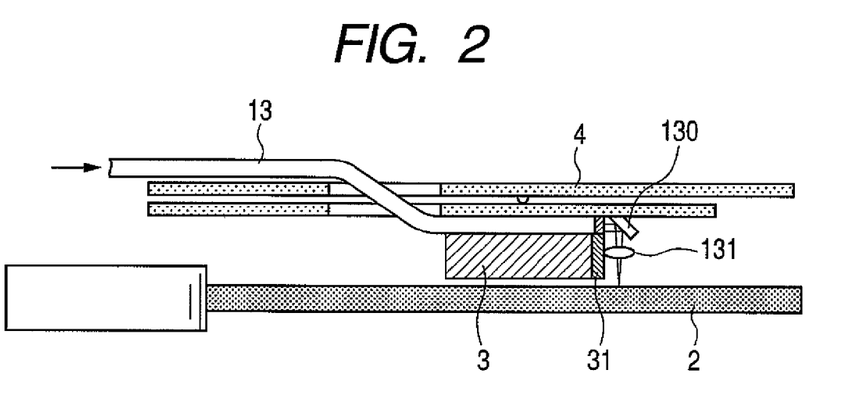
FIG. 2 is a cross-section view in FIG. 1, for explaining the principle portions of the magnetic disk drive with applying the thermal assist method therein.

FIG. 2 is an A-A cross-section view in FIG. 1, for showing the principle portions of the magnetic disk drive, due to the fluid pressure.

In this FIG. 2, the slider 3 mounted on the suspension 4 made from a stainless thin plate flies on the disk 2, separating with a very small gap, such as, about several tens nm (nanometers) therefrom, for example. The wave guide is guided in the vicinity of the recording coil 31 of the slider 3, then a light changes the optical path thereof by 90 degree upon a mirror 130, and it changed to a near-field, through a near-field light converter element 131, to be irradiated thereupon, thereby enabling to heat a very small region or area of about several tens nm square on the disk 2, up to high temperature, such as, about 200° C.

Next, the operation of the present embodiment will be explained.

In FIG. 1 mentioned above, due to the function of the voice coil motor 52 for use of writing the recording information, the slider 3 does the rocking motion abound the center of the pivot 51 on the disk 2. When writing, a signal is applied to a predetermined laser, among the plurality of semiconductor laser elements 121 (shown in FIG. 3) provided within the semiconductor laser module 12, so as to oscillate that laser. Next, the light is guided into the wave guide 13, which is optically connected with the semiconductor laser elements 121 (shown in FIG. 3). The light entering into the wave guide comes to be a very fine light through the near-field light converter element 131, which is provided in the vicinity of the recording coil 31, and heats up a very small region or area on the disk 2, from a predetermined slider 3. A magnetic field generated by the recording coil acts on the recording layer, the magnetic coercive force of which goes down due to the heating thereof, and thereby the writing of information is conducted. Next, when stopping the laser from the oscillation thereof, since the disk 2 rotates at high speed, then the heated portion is cooled, rapidly, and the temperature thereof falls down; therefore, the content of magnetic recording is reserved.

On the other hand, a part of the heat generated with conduction of electricity through the semiconductor laser element 121 (shown in FIG. 3) is transmitted to a side surface of the arm 5, in vicinity of the pivot thereof. Also, as is characterized in the present invention, since the heat-conductive flexible member 15 is thermally connected up to the base-heat conducting member 14 of the base, then the heat moves thereto through heat conduction. The heat transmitted to the surface of the base 7 is spread or diffused on the base 7, being made of aluminum and high in the thermal conductivity thereof, and is conducted into an interior air, with which high thermal conductivity can be obtained due to the operation of the disk 2 rotating within the magnetic disk drive. The heat transmitted to the base 7 is spread or diffused onto wide areas within the magnetic disk drive, and therefore an increase of temperature is flat, and the heat can be transferred into an outside with using those wide areas.

In this instance, since the flexible board 8 and the heat-conductive flexible member 15 are provided in such directions, that they cancel the rotating force of the arm, with each other, they will not obstructs the positioning accuracy of the recording coil 31 on the disk 2.

Figure 3:
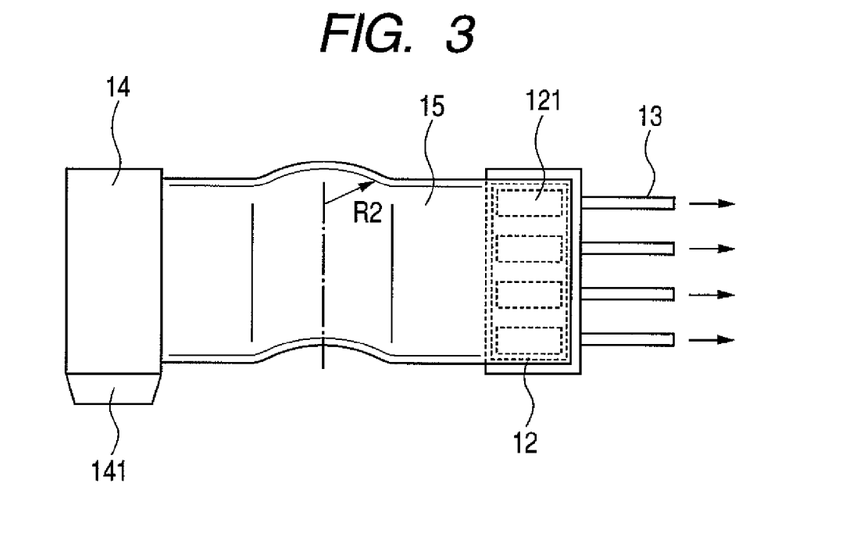
FIG. 3 is a view for showing a flexible member according to the present invention.

FIG. 3 is a partial cross-section view for showing the heat-conductive flexible member 15.

In this FIG. 3, at one end of the heat-conductive flexible member 15, it is thermally connected with the semiconductor module 12, which mounts the semiconductor laser elements 121 thereon, in the plural number thereof. The other end thereof is connected with the base-heat conducting member 14. At a lower end of the base-heat conducting member 14 is provided a base connecting projection 141 to be inserted into a predetermined opening portion on the base 7, thereby fitting therein.

Figure 4:
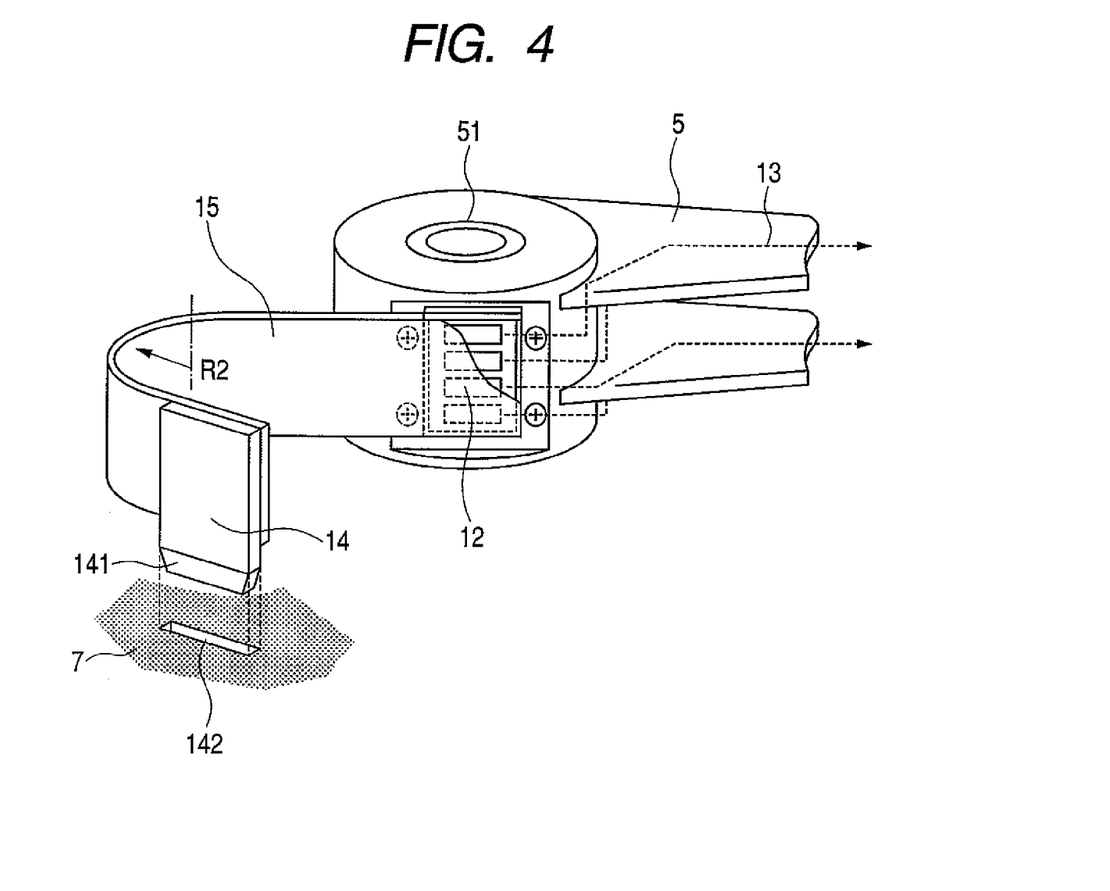
FIG. 4 is a perspective outlook view when installing the flexible member on an arm, according to the present invention.

FIG. 4 is a perspective view for showing the condition of mounting the heat-conductive flexible member onto the arm.

In this FIG. 4, the flexible board 8 (not shown in the figure) is fitted, disposing the center of the heat-conductive flexible member 15 having the curvature "R2" on a side near to the pivot center 51 of the arm 5 and inserting the base connecting projection 141 into the opening portion 142 of the base 7. For the purpose of reducing the contact thermal resistance at the portion of this insertion, it is preferable or desirable to increase the contact pressure, and also to enlarge or widen the contact area thereof, as large as possible.

Embodiment 2

Figure 5:
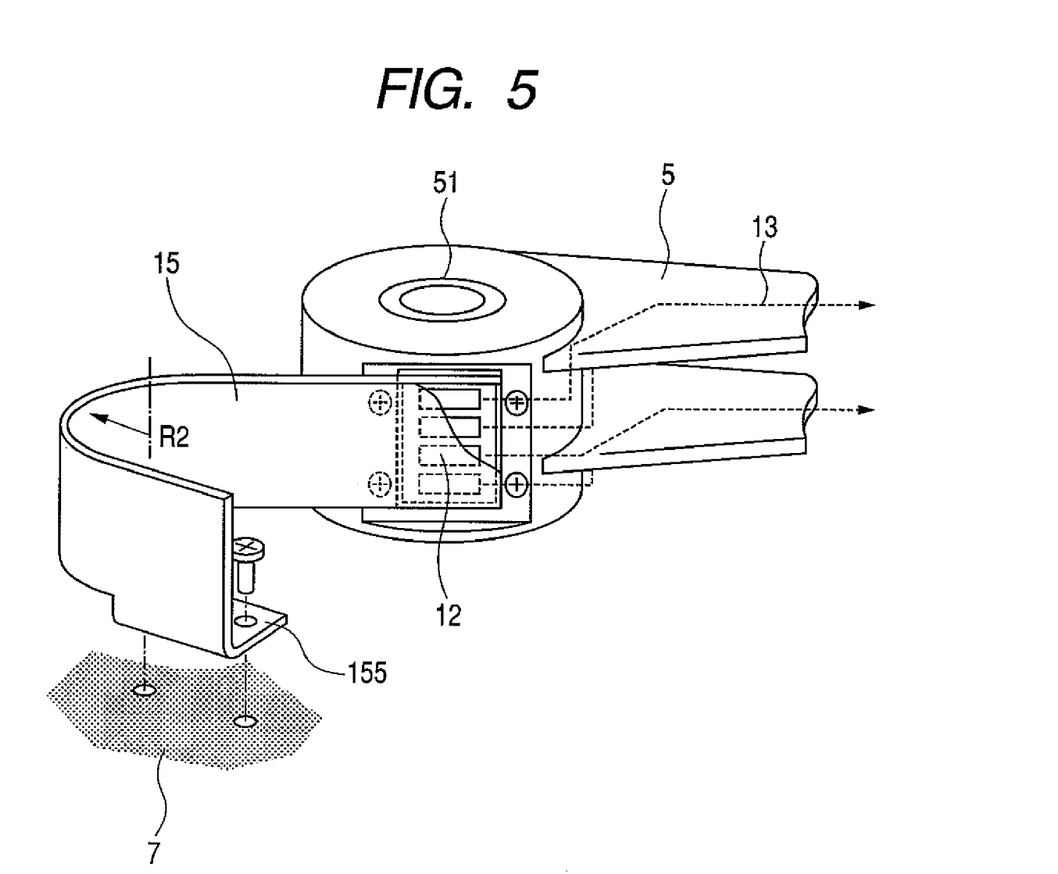
FIG. 5 is a perspective outlook view when installing the flexible member on the arm, according to a second embodiment of the present invention.

FIG. 5 is a view for showing a second embodiment of the present invention, and it corresponds to FIG. 4 mentioned above.

In this FIG. 5, an aspect differing from that shown in FIG. 4 lies in the structure of joining or fastening other end 155 of the heat-conductive flexible member 15 on the base 7, directly, by a screw, with provision of no such base-heat conducting member 14. With such the structure, it is possible to reduce a number of parts, comparing to that in the structure shown in FIG. 4.

Embodiment 3

Figure 6:
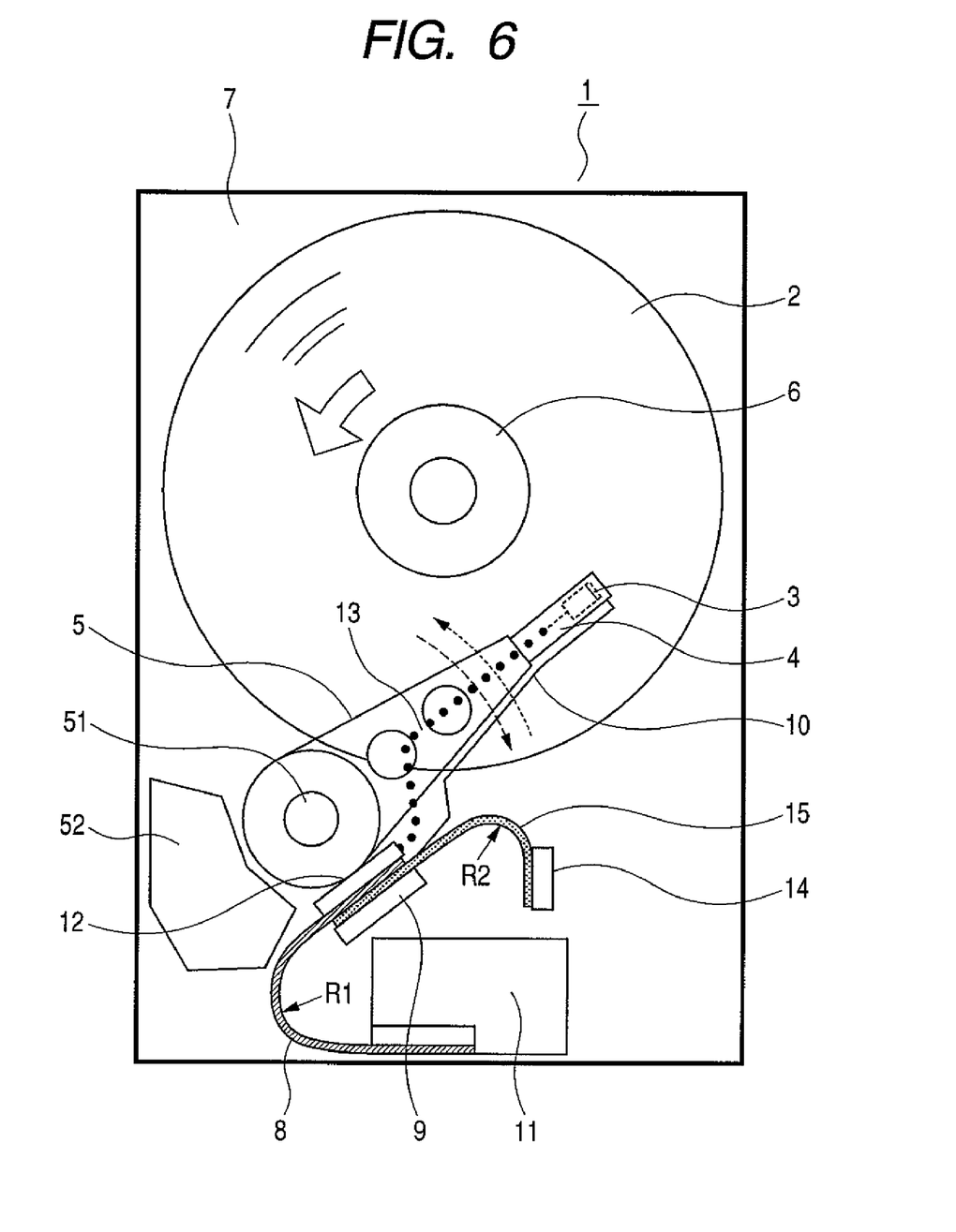
FIG. 6 is a view for showing a magnetic disk drive, removing a housing thereof, according to a third embodiment of the present invention.

FIG. 6 is a view for showing the magnetic disk drive, with removing a cover therefrom, for explaining a third embodiment.

In this FIG. 6, an aspect differing from the embodiment shown in FIG. 1 lies in that the flexible board 8 and the heat-conductive flexible member 15 are disposed around the pivot 51, but in the reversed direction thereto. Thus, the heat-conductive flexible member 15 is provided on the side near to the arm while the flexible board 8 is on the side near to the voice coil motor 52.

With the present embodiment, because of disposition of the heat-conductive flexible member 15 on the side near to the disk 2, it is possible to increase an amount of heat radiation from the surface of the heat-conductive flexible member 15, with an aid of airflow at high speed, which is generated due to the function of the rotating disk.

Embodiment 4

Figure 7:
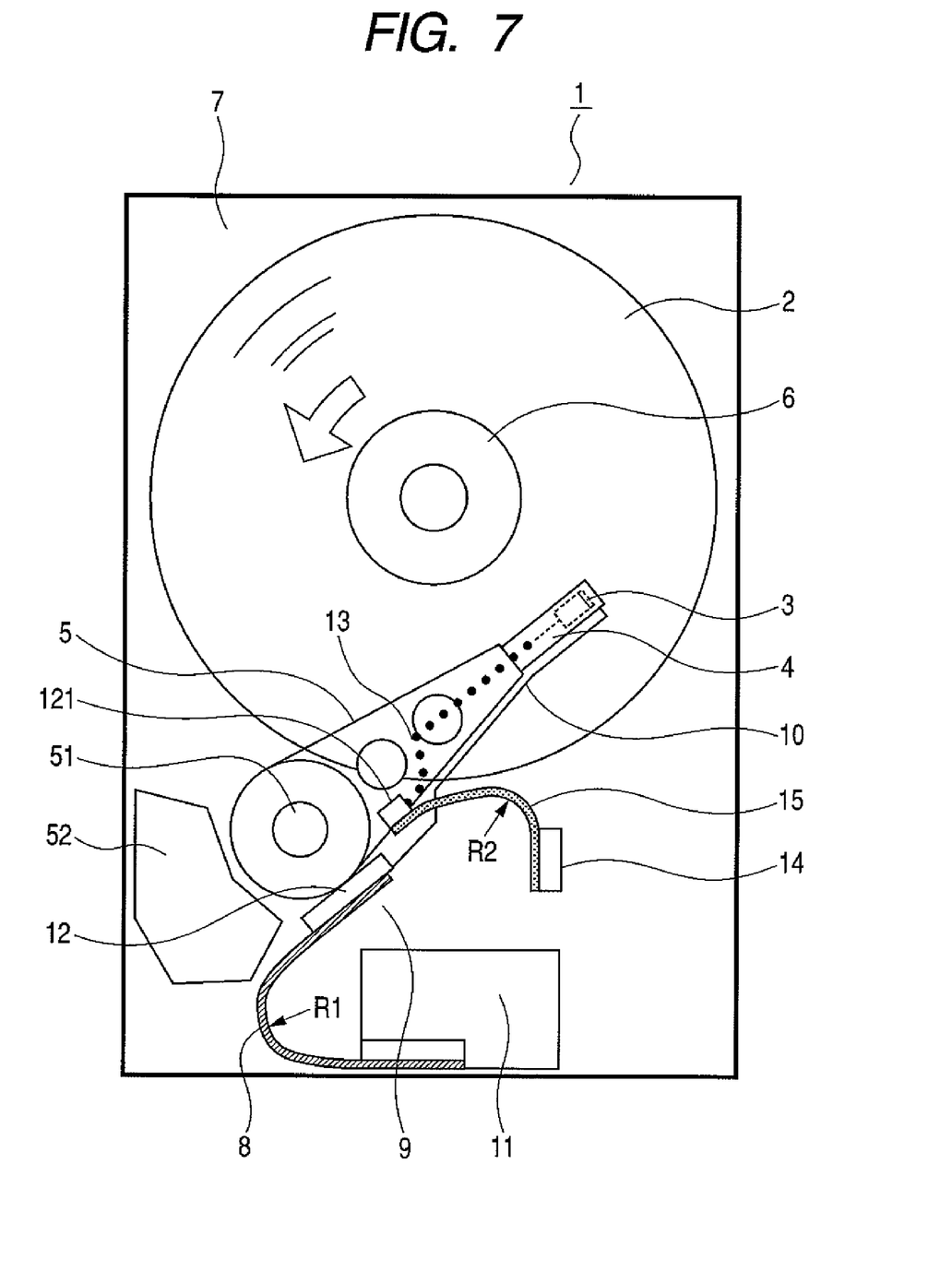
FIG. 7 is a view for showing a magnetic disk drive, removing a housing thereof, according to a fourth embodiment of the present invention.

FIG. 7 is a view for showing the magnetic disk drive, with removing a cover therefrom, for explaining a fourth embodiment.

Figure 12:
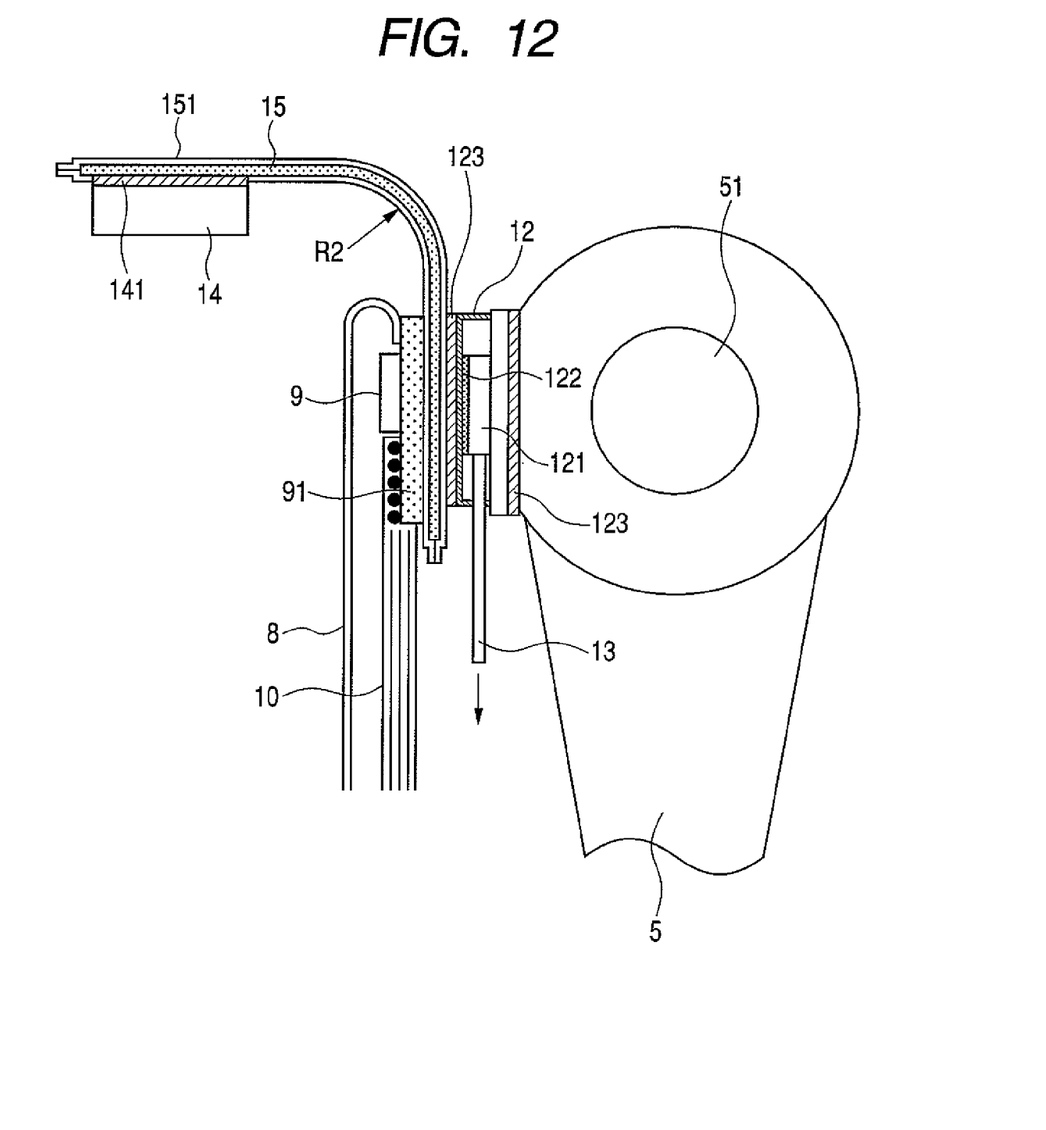
FIG. 12 is a perspective outlook view when installing a flexible member on an arm of a semiconductor laser module, according to the ninth present invention.

In this FIG. 7, an aspect differing from the embodiment shown in FIG. 1 lies in that the semiconductor laser element 121 is installed at the position near to the side of the slider rather than a movable center of the arm 5. In more details, it is in the condition that each one (1) piece of semiconductor laser elements is mounted on the upper surface and the lower surface of the arm 5, respectively. With such the structure, the semiconductor laser elements may be not in the form of the module, and therefore a degree of freedom when installing them can be improved. Also, since the semiconductor laser elements can be handled, separately or individually, it is also possible to obtain an improvement of a year rate or productivity thereof. Also, in FIG. 12 are shown the semiconductor laser elements 121 being mounted on the arm 5, but also in case of being mounted on a flexible board 10, the effect of the present invention can be obtained; i.e., the heat radiation can be achieved through the heat-conductive flexible member 15, even when there is no heat conduction to the arm.

Embodiment 5

Figure 8:
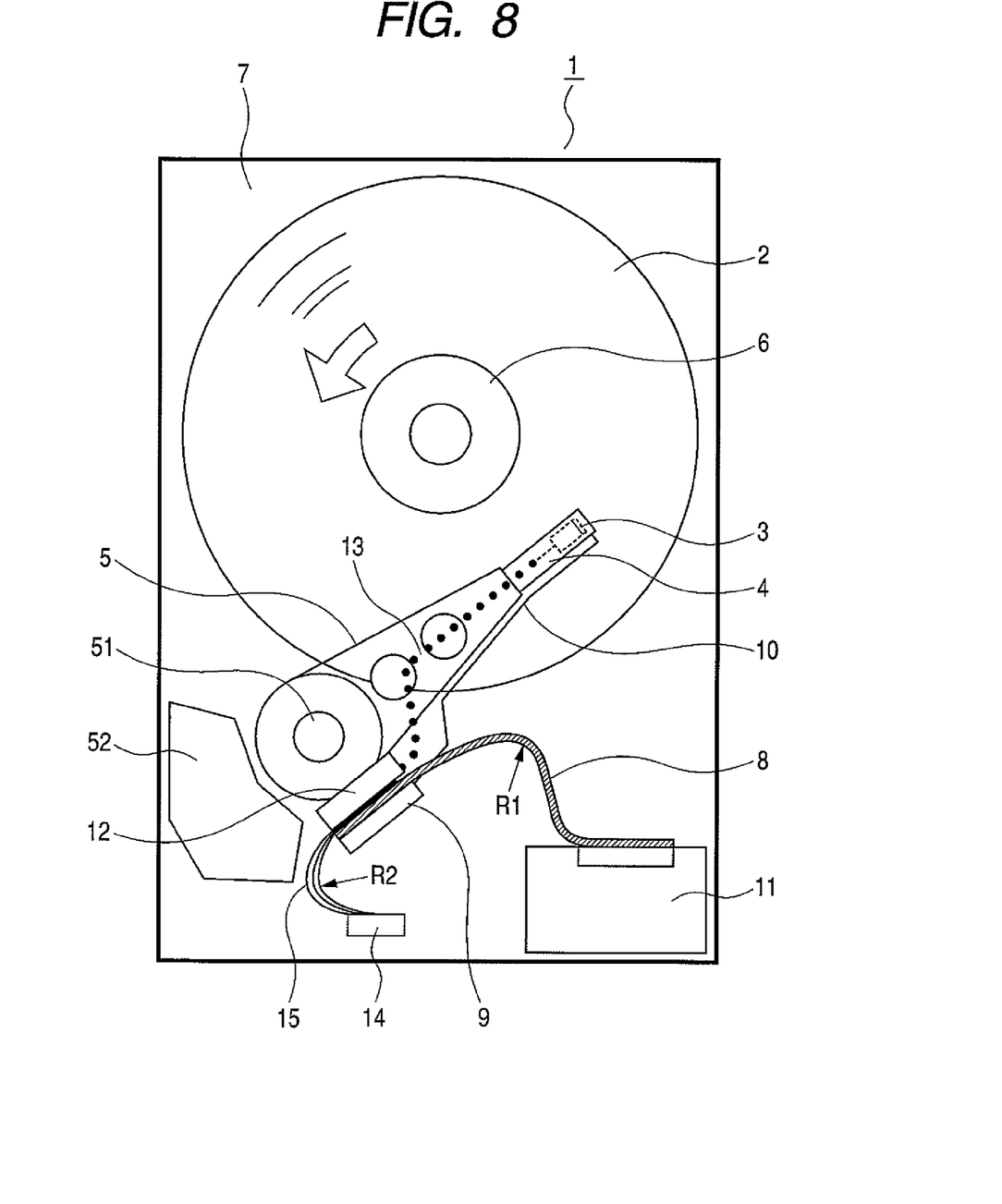
FIG. 8 is a view for showing a magnetic disk drive, removing a housing thereof, according to a fifth embodiment of the present invention.

FIG. 8 is a view for showing the magnetic disk drive, with removing a cover therefrom, for explaining a fifth embodiment.

In this FIG. 8, an aspect differing from the embodiment shown in FIG. 1 lies in that the heat-conductive flexible member 15 is constructed with, not only one (1) piece, but laminating a plural number of the heat-conductive flexible members 15. With such structure, it is not necessary to keep the cross-section area of the heat-conductive flexible members 15, for reducing the thermal resistance thereof, by increasing the thickness of one (1) piece of the heat-conductive flexible member 15, but building up it with the plural number thereof, it is possible to keep the cross-section area necessary for the heat conduction with lowering the rigidity of the flexible member.

Embodiment 6

Figure 9:
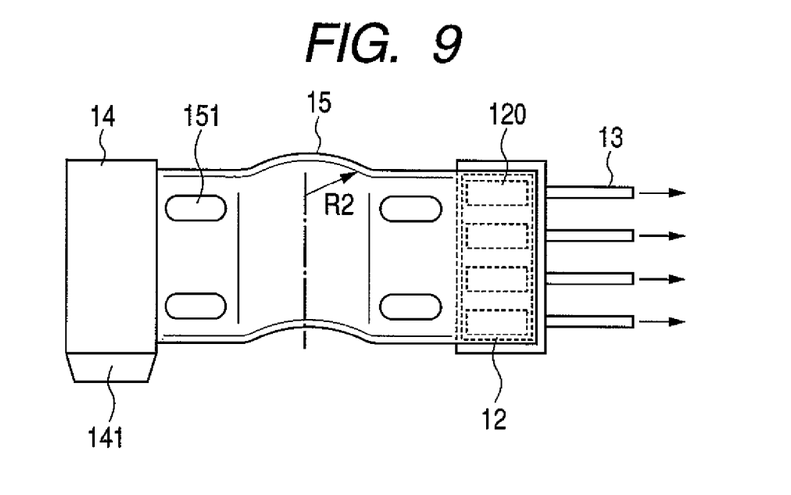
FIG. 9 is the cross-section view of a flexible member, according to a sixth embodiment of the present invention.

FIG. 9 is a view of the flexible member, according to a sixth embodiment.

In this FIG. 9, an aspect differing from the embodiment shown in FIG. 1 lies in that a laminate 151 is provided on the heat-conductive flexible member 15. With such structure, though reducing the cross-section area of the heat-conductive flexible member 15, but with guiding airflow from an outside of the heat-conductive flexible member 15 into an inside thereof, there can be obtained an effect of allowing the heat-conductive flexible member 15 to be used as a heat radiation surface.

Embodiment 7

Figure 10:
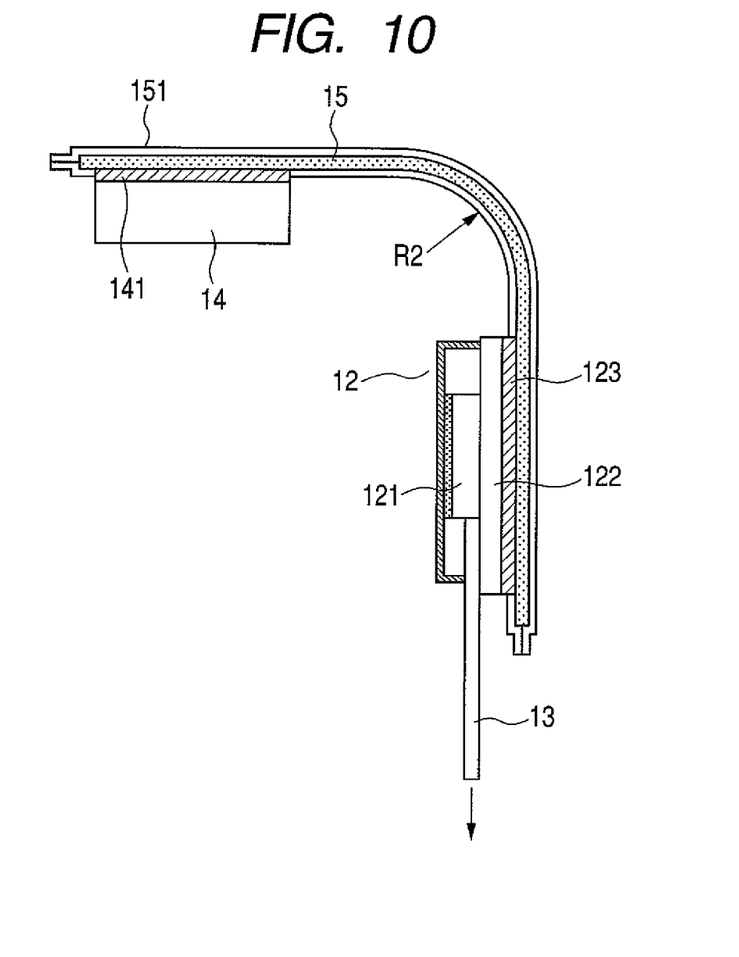
FIG. 10 is the cross-section view of a flexible member, according to a seventh embodiment of the present invention.

FIG. 10 is the vertical cross-section view of the flexible member, according to a seventh embodiment.

In this FIG. 10, the semiconductor module 12 is attached on the heat-conductive flexible member 15, in more details, through a heat-conductive adhesive layer 122 at one end portion of the heat-conductive flexible member 15. At the other end portion of the heat-conductive flexible member 15 is adhered the base-heat conducting member 14 through the heat-conductive adhesive layer 122. On other surface thereof is treated a laminate of resin 151. With such structure, particularly, in case where the heat-conductive flexible member 15 is made of a material of a carbon group, it is possible to protect from defects, such as, deterioration due to falling off of a broken piece(s) thereof, or electrical short-circuit due to falling down thereof on terminals of electronic parts.

Embodiment 8

Figure 11:
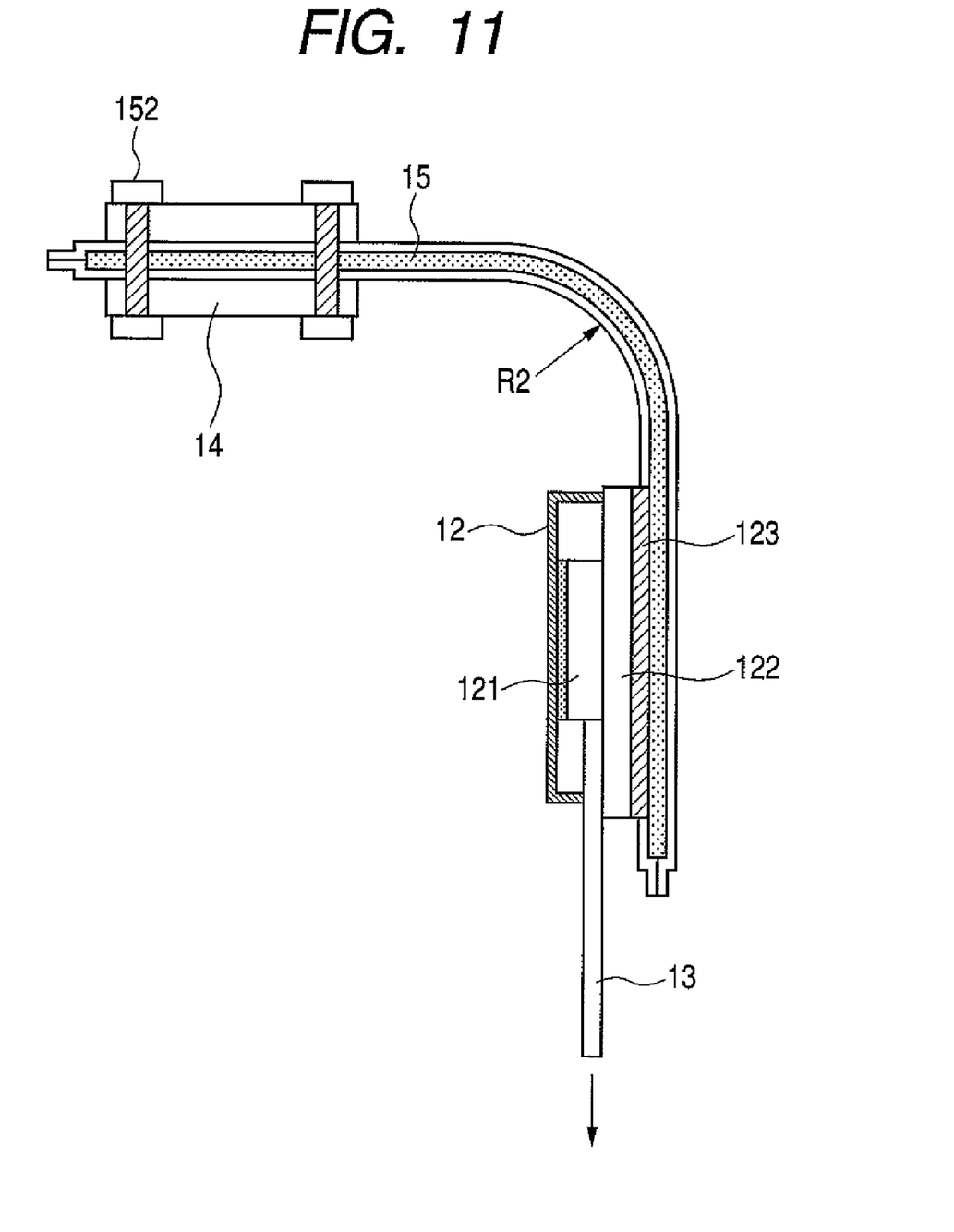
FIG. 11 is the cross-section view of a flexible member, according to an eighth embodiment of the present invention.

FIG. 11 is the horizontal cross-section view of the flexible member, according to an eighth embodiment.

In this FIG. 11, an aspect differing from that shown in FIG. 10 lies in that the base-heat conducting member 14 is divided and the heat-conductive flexible member 15 is put or sandwiched between them by a screw clamp. With such structure, not only adhesion, but also with the mechanical clamping thereof, it is possible to reduce the thermal resistance thereof.

Embodiment 9

FIG. 12 is the horizontal cross-section view of the flexible member, according to a ninth embodiment.

In this FIG. 12, the semiconductor module 12 is mounted on a side surface portion of the pivot 51 of the arm 5, and on the other surface opposite thereof is connected the heat-conductive flexible member 15. Further on an upper side thereof is mounted a substrate or board 91 of the arm-mounted circuit board 9. In this instance, the substrate portion of the semiconductor module 12 and the side surface portion facing to the arm are reduced in the contact thermal resistance thereof by putting a heat-conductive sheet 123 between them. Also, within the semiconductor module 12, an side surface of the semiconductor laser element 121, opposite to a solder connection surface thereof, and an interior wall of a module housing are bonded through a heat-conductive adhesive layer 122, etc., for thermally combining them with each other. In this instance, it is preferable the adhesive has such characteristics of brining about no mechanical stress on the semiconductor laser element 121.

With providing the semiconductor module 12 on the side nearest to the arm, in this manner, it is possible to establish a main path for the heat radiation on the side of the arm, and thereby reducing the thermal resistance small. Also, the heat radiation can be achieved with using the heat-conductive flexible member 15, through the heat conduction from the rear side surface of the semiconductor laser element 121. Further, the heat generation from the arm-mounted circuit board 9 can be also cooled down, effectively, since the substrate or board 91 and the heat-conductive flexible member 15 are connected with, thermally.

As was mentioned above, in the magnetic disk drive, applying the thermal assist method therein, according to the present invention, comprising: an arm for supporting a suspension, attaching a slider at the tip thereof and conducting rocking motion around a pivot; a base for supporting a disk rotating motor thereon; a semiconductor laser module fixed on the arm to conduct the rock motion therewith and storing a semiconductor laser element therein; and a light irradiation portion upon the disk surface, wherein the light irradiation portion and the semiconductor laser module are connected with a wave guide, the semiconductor laser module and a part or portion of the base, or a portion of a member attached on the base are connected therebetween, by a heat-conductive flexible member 15.

Further, it has a flexible board, connecting a circuit board fixed on the arm and a circuit board fixed on the base, and having curvature due to bending within the drive, and the heat-conductive flexible member has curvature due to bending within the magnetic disk drive and a center of the curvature in vicinity of the pivot.

Further, in the magnetic disk drive, applying the thermal assist method therein, according to the present invention, comprising: an arm for supporting a suspension, attaching a slider at the tip thereof and conducting rocking motion around a pivot; a base for supporting a disk rotating motor thereon; a semiconductor laser module fixed on the arm to conduct the rock motion therewith and storing a semiconductor laser element therein; and a light irradiation portion upon the disk surface, wherein the light irradiation portion and the semiconductor laser module are connected with a wave guide, the semiconductor laser module and a part or portion of the base, or a portion of a member attached on the base are connected therebetween, by a heat-conductive flexible member, and a direction, in which the arm rotates around the pivot is in a direction opposite to a force, with which the flexible board brings said arm to rotate.

Further, the flexible heat-conductive member has structure of putting a metal thin film of a cupper group between electrically insulating members, such as, polyimide films, for example. Further, the member attached on the base is constructed with a member, which is to be inserted into an opening formed on the base. Further, having a circuit board for use of recording coil, which is fixed on the arm and conducts the rocking motion at the same time, the semiconductor module is provided on a side near to the arm rather than said circuit board.

Further, the semiconductor laser elements fixed on the arm are attached on a side near to the suspension rather than in the vicinity of the pivot. Further, the flexible heat-conductive member is built up by piling up as least two (2) pieces of members, being same to each other in shapes thereof. Further, a through hole is provided on a surface of the flexible heat-conductive member in a direction perpendicular thereto. Further, a portion of the base or a member attached on the base is adhered at one end of a core material of the flexible heat-conductive member, and at other end thereof is adhered the semiconductor laser module.

Further, a portion of the base or a member attached on the base is put in at an end of the flexible heat-conductive member, to be fixed. And further, heat conductivity of the core material of the flexible heat-conductive member is equal to or higher than 200 W/mK in a surface direction thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A magnetic disk drive, comprising:
   a slider, which is provided at a position facing to a disk surface;
   an arm, which is configured to conduct rocking motion around a pivot;
   a base, which is configured to support a motor thereon, which rotates said disk;
   a semiconductor laser module, which is configured to be fixed on said arm and stores a semiconductor laser element therein;
   a light irradiation portion upon said disk surface; and
   a wave guide, which is configured to build up an optical path between said light irradiation portion and said semiconductor laser module, wherein
   said semiconductor laser module and a portion of said base are connected therebetween by a flexible heat-conductive member being longer than the distance in a straight line for these two points between said semiconductor laser module and said portion of said base, and having a predetermined curvature between said two points.

2. The magnetic disk drive, as described in the claim 1, wherein
   a curvature of a flexible board, which connects a circuit board, which is fixed on said arm, and a circuit board, which is fixed on said base, and the curvature of said flexible heat-conductive member are so determined that centers of both the curvatures are located in vicinity of said pivot.

3. The magnetic disk drive, as described in the claim 2, wherein
a direction, in which said arm rotates around said pivot due to the predetermined curvature of said flexible heat-conductive member, is in a directed opposite to a force, with which said flexible board brings said arm to rotate.

4. The magnetic disk drive, as described in the claim 1, wherein
said flexible heat-conductive member has structure of putting a metal thin film of a cupper group between electrically insulating members, including polyimide films.

5. The magnetic disk drive, as described in the claim 1, wherein
said flexible heat-conductive member is a graphite sheet, which is laminated by a member made of a resin.

6. The magnetic disk drive, as described in the claim 1, wherein
an opening is formed on said base, and a member is provided to be inserted into that opening.

7. The magnetic disk drive, as described in the claim 1, wherein
a circuit board for use of a recoding coil is fixed on said arm, and said semiconductor laser module is provided on side near to the arm rather than said circuit board.

8. The magnetic disk drive, as described in the claim 1, wherein
the semiconductor laser elements fixed on said arm are attached on side near to the suspension rather than vicinity of said pivot.

9. The magnetic disk drive, as described in the claim 1, wherein
said flexible heat-conductive member is built up by piling up as least two (2) pieces of members, being same to each other in shapes thereof.

10. The magnetic disk drive, as described in the claim 1, wherein
a through hole is provided on a surface of said flexible heat-conductive member in a direction perpendicular thereto.

11. The magnetic disk drive, as described in the claim 1, wherein
a portion of said base is adhered at one end of a core material of said flexible heat-conductive member, and at other end thereof is adhered said semiconductor laser module.

12. The magnetic disk drive, as described in the claim 1, wherein
said flexible heat-conductive member is fixed by base heat-conductive members, which are divided into two (2), by putting it between them.

13. The magnetic disk drive, as described in the claim 1, wherein
heat conductivity of the core material of said flexible heat-conductive member is equal to or higher than 200 W/mK in a surface direction thereof.

* * * * *